No. 884,035. PATENTED APR. 7, 1908.
J. H. NIELD.
PROCESS OF PRODUCING MIXTURES OF SULFURIC AND NITRIC ACIDS.
APPLICATION FILED APR. 5, 1905.
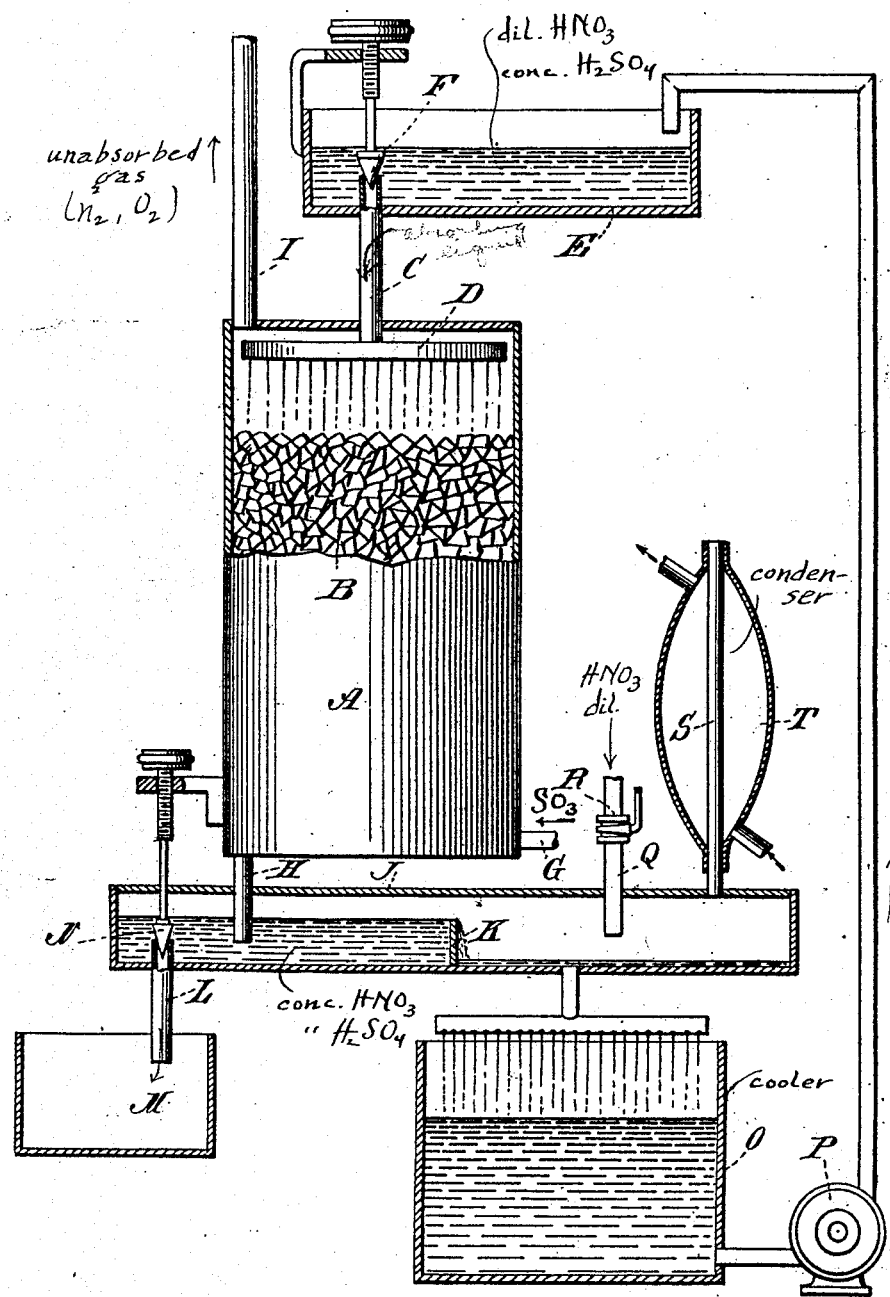
Witnesses
Inventor
John Herbert Nield
By his Attorneys

UNITED STATES PATENT OFFICE.

JOHN HERBERT NIELD, OF HACKENSACK, NEW JERSEY, ASSIGNOR TO GENERAL CHEMICAL COMPANY, OF NEW YORK, N. Y., A CORPORATION OF NEW YORK.

PROCESS OF PRODUCING MIXTURES OF SULFURIC AND NITRIC ACIDS.

No. 884,035.      Specification of Letters Patent.      Patented April 7, 1908.

Application filed April 5, 1905.   Serial No. 253,918.

*To all whom it may concern:*

Be it known that I, JOHN HERBERT NIELD, a citizen of the United States, and a resident of Hackensack, Bergen county, State of New Jersey, have invented certain new and useful Improvements in Processes of Producing Mixtures of Sulfuric and Nitric Acids, of which the following is a specification.

My invention relates to the production of mixtures of sulfuric and nitric acids such as are used for nitrating purposes, as, for instance, in the manufacture of explosives.

The object of my invention is to produce such mixtures in an economical manner.

The invention will be fully described hereinafter and the features of novelty pointed out in the appended claims.

Reference is to be had to the accompanying drawing, which illustrates, partly in section, a plant suitable for carrying out my invention.

Briefly described, my process consists in causing gaseous sulfuric anhydrid to be absorbed by a mixture of strong sulfuric acid and weak nitric acid. The process is carried out in a continuous cycle.

In the drawing, A indicates the absorbing tower filled with any suitable irregular-shaped material such as coke, as indicated at B. This absorber is provided at the top with an inlet pipe C for the admission of the absorbing liquid, said inlet pipe terminating within the tower A in a distributing or spraying device D. The supply to the pipe C may come from a tank E, and the connection of the tank with the pipe C may be controlled by an adjustable valve F. The inlet G for the anhydrid gas is located at the bottom of the absorbing tower A; the outlet H for the absorption product is also located at the bottom; and at the top I may locate an outlet pipe I for the escape of any unabsorbed gases such as nitrogen or oxygen. The product which flows out through the pipe H is received in a tank J, which is divided into two compartments by a partition K, forming at the same time an overflow. A portion of the product is removed from the tank J through a pipe L into a tank M, and this portion forms the final product of the process. A valve N may control the outflow of the liquid from the tank J to the tank M. The other portion of the product which overflows at K is passed into a cooling tank O and is then brought back to the supply tank E in any suitable manner, as by means of a pump P. This portion of the product which is brought back to the supply tank and to the absorption tower is diluted at any suitable point of its travel or path with weak nitric acid, continuously supplied in the proper proportion through a pipe Q having a regulating valve R. In the drawing the pipe Q is arranged to discharge the weak nitric acid into the overflow compartment of the tank J, but the diluting agent might be introduced at any other point of the path of that portion of the product which is circulated by the pump P. I consider it preferable, however, to add the diluent before the liquid is cooled, since considerable heat is developed by pouring the weak nitric acid into the strong sulfuric acid.

It may be advisable in some cases to provide a condenser pipe S communicating with the tank J, the top of which is closed in this case, this pipe being open to the air at the top and cooled by water circulating in a jacket T. Nitric acid vapors rising from the liquid will be condensed in the pipe S, the condensation product flowing back into the tank J.

At the beginning of the process, the tank E would be filled with a mixture of a weak solution of nitric acid ($HNO_3$), say a solution of about 40 degrees Bé., and a strong solution of sulfuric acid ($H_2SO_4$), say of 98 per cent.; the amount of nitric acid used may be such as to bring the strength of sulfuric acid in the mixture down to 96 per cent. Then the valve F would be opened and a current of sulfuric anhydrid ($SO_3$) would be introduced at the bottom of the absorption tower A and forced upward therethrough in the usual way. The mixed solution of acids being weak is capable of absorbing a large amount of sulfuric anhydrid, and by properly proportioning the amount of weak nitric acid and of sulfuric anhydrid I may secure at the outlet H a mixture of strong sulfuric acid and strong nitric acid. This forms the final product received in the tank M. That portion of the acid mixture which is returned to the supply tank E by the pump P is diluted in the tank J by the addition of weak nitric acid from the pipe Q. The heat developed by the absorption of the anhydrid and by the addition of this nitric acid is removed in the cooler O, before the liquid is again used to absorb the sulfuric anhydrid. When the condenser S is used, the vapors of nitric acid will be condensed to liquid form and thus returned to the tank J. When the several valves have been set as required for the continuous operation, the amount of dilution taking place in the tank J will be just sufficient to enable the absorbing liquid issuing at the spray D to take up the anhydrid supplied through the pipe G.

When the operation is continuous, the condition of the mixture will be constant, or approximately so, at each particular point of the apparatus; that is, the strength of the acid mixture in the tank E will not vary, or at least not materially, and similarly, the strength of the final product in the left-hand compartment of the tank J will be practically constant. This of course implies that the amount of sulfuric anhydrid which is absorbed by the acids mixture in the tower A, must be approximately equal to the amount of absorbed anhydrid withdrawn at the valve N, or in other words, the rate of withdrawal should correspond to the rate of absorption, since otherwise with the amount of outflow and inflow equal for the supply tank E) it would not be possible to preserve a uniform composition of the mixture in the supply tank.

It will be obvious that the strength of the final product may be varied as desired by a suitable manipulation of the valves. The sulfuric acid contained in the final product may have a strength of from 98 to 99 per cent. if desired. The nitric acid used as diluent may be of a strength of 40 degrees Bé. as above stated, but may be much weaker if desired.

The chief advantage of my invention resides in its great economy, inasmuch as by a single absorbing operation I am enabled to produce a strong mixture of nitric acid and sulfuric acid, the proportions of which may be varied, and the fact that weak nitric acid of any strength may be used. The continuous character of the process is of considerable practical value.

Various modifications may be made without departing from the nature of my invention.

I claim as my invention:

1. The herein described process of producing a mixture of sulfuric and nitric acids, which consists in causing gaseous sulfuric anhydrid and a distributed or spread-out mixture of sulfuric acid and weak nitric acid to travel in opposite directions in contact with each other, reserving a portion of the product as the final product, returning the remainder of the product to the first stage of the process to again absorb the anhydrid, and diluting such remainder on its return path with weak nitric acid.

2. The herein described process of producing a mixture of sulfuric and nitric acids, which consists in bringing gaseous sulfuric anhydrid in contact with a mixture of sulfuric acid and weak nitric acid, reserving a portion of the product as the final product, adding weak nitric acid to the remainder of the product to dilute it, cooling such diluted product, and returning the cooled diluted product to the first stage of the process to again absorb the anhydrid.

3. The herein described process of producing a mixture of sulfuric and nitric acids, which consists in bringing gaseous sulfuric anhydrid in contact with a mixture of sulfuric acid and weak nitric acid, reserving a portion of the product as the final product, adding weak nitric acid to the remainder of the product, condensing any nitric acid vapors which may form upon the addition of the weak nitric acid, and returning such condensed vapors together with the diluted portion of the product to the first stage of the process to again absorb the anhydrid.

4. The herein described process of producing a mixture of sulfuric and nitric acids, which consists in bringing gaseous sulfuric anhydrid in contact with a mixture of sulfuric acid and weak nitric acid, reserving a portion of the product as the final product, adding weak nitric acid to the remainder of the product to dilute the same, condensing any nitric acid vapors which may form upon the addition of the weak nitric acid, cooling the diluted product and the condensed vapors returned thereto, and conveying the cooled diluted product back to the first stage of the process to again absorb the anhydrid.

5. The herein described process of producing a mixture of sulfuric and nitric acids, which consists in bringing a sprayed downwardly traveling mixture of sulfuric acid and nitric acid into contact with an upward stream of gaseous sulfuric anhydrid, withdrawing a portion of the product at the bottom, returning the remainder to the first stage of the process, and diluting such remainder on its return path, with weak nitric acid.

6. The herein described process of producing a mixture of sulfuric and nitric acids, which consists in causing a distributed or spread-out mixture of sulfuric acid and nitric acid to travel in one driection, and a stream of gaseous sulfuric anhydrid to travel in the opposite direction and in contact with said acids mixture, to be absorbed thereby.

7. The herein described process of producing a mixture of sulfuric and nitric acids, which consists in bringing a stream of gaseous sulfuric anhydrid into contact with a traveling mixture of sulfuric acid and nitric acid, so as to cause the anhydrid to be absorbed by said acids mixture, removing from the resulting product continuously a portion containing an amount of anhydrid practically equal to that absorbed from said stream immediately before, returning the remainder of the product to the first stage of the process, and diluting such remainder on its return path, to its original strength, by the addition of weak nitric acid.

In testimony whereof, I have signed my name to this specification in the presence of two subscribing witnesses.

JOHN HERBERT NIELD.

Witnesses:
WILLIAM H. JENKINS,
E. H. STRICKLER.